March 29, 1949.  J. I. HALL  2,465,532
TEMPERATURE CONTROL SYSTEM FOR PASTEURIZERS
Filed Oct. 20, 1947
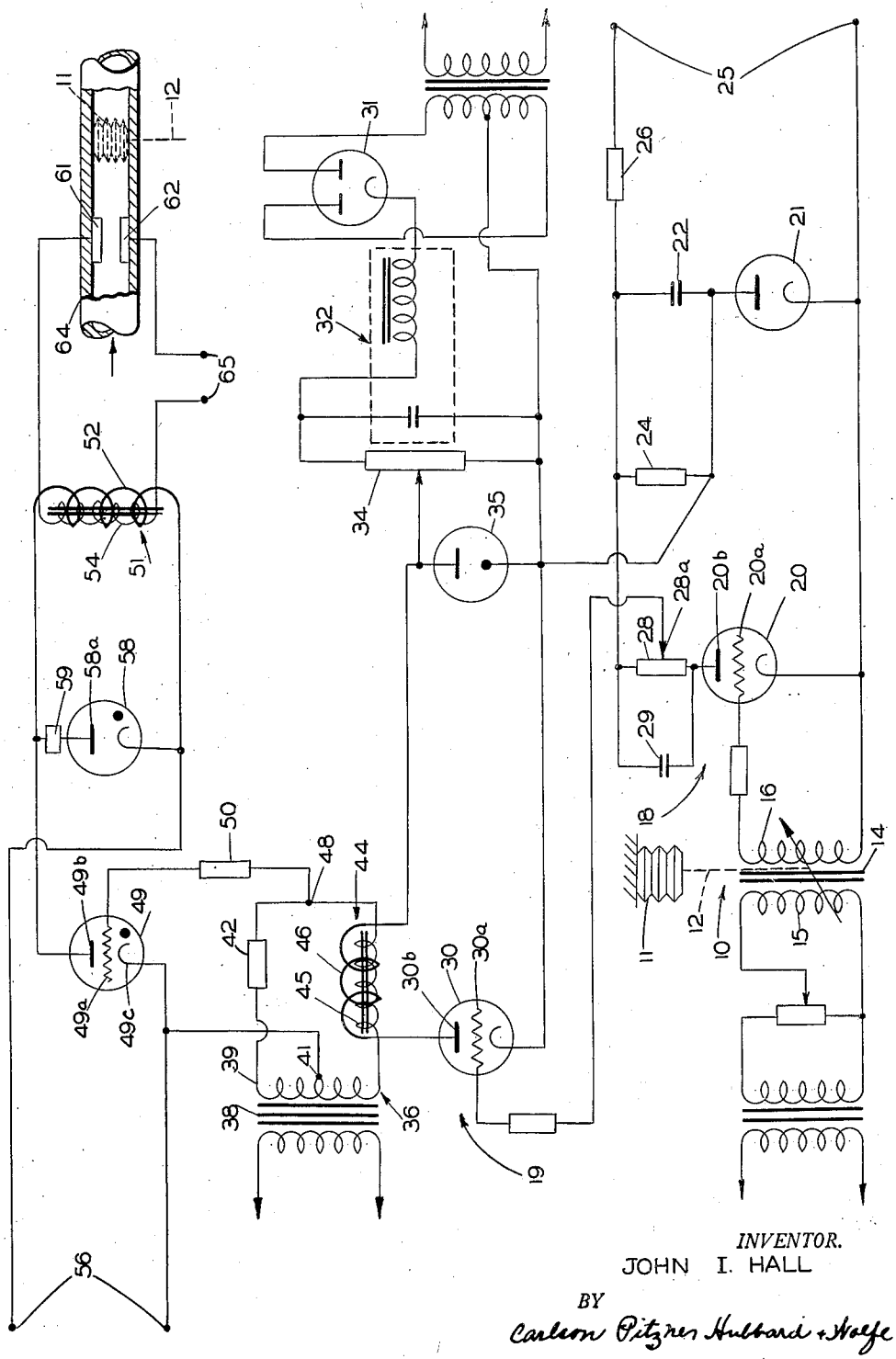
INVENTOR.
JOHN I. HALL
BY
Carlson Pitzner Hubbard + Wolfe
ATTORNEYS Patented Mar. 29, 1949

2,465,532

UNITED STATES PATENT OFFICE 2,465,532

TEMPERATURE CONTROL SYSTEM FOR PASTEURIZERS

John I. Hall, Platts Mills, Conn., assignor to Ex-Cello-O Corporation, Detroit, Mich., a corporation of Michigan Application October 20, 1947, Serial No. 780,968

1 Claim. (Cl. 219—20)

The present invention relates to apparatus for maintaining a desired physical condition such as temperature, and more specifically to a temperature control system for use in a milk pasteurizer.

The pasteurization of milk has been effected by heating it in various ways, for example by electrical heaters or by passing current between suitable electrodes in direct contact with the milk. While the latter method of heating is advantageous for a number of reasons well known to those skilled in the art, it is nevertheless subject to a number of factors making it difficult to maintain the temperature within the close tolerances (161-164 degrees Fahrenheit) required for satisfactory pasteurization. For example, milk has been found to vary in composition particularly with regard to the concentration of certain salts contained therein, depending upon the season of the year and type of feed. While the variation in composition may be slight, the resulting variation in electrical resistance is appreciable. Further, the milk is preferably treated by a continuous flow process and the heat required for pasteurization will thus depend on the rate of flow and initial temperature thereof. The initial temperature upstream from the heater is particularly important since milk has a rather high negative temperature coefficient.

It is accordingly, an object of the present invention to provide a control circuit for maintaining the temperature of a flowing stream of milk, heated by passage of current between milk-contacting electrodes, within prescribed narrow limits in spite of variation both in the resistance between the electrodes and in the amount of heat required to be generated.

It is a further object of the invention to provide in a pasteurization system means for changing the impedance of an A. C. heating circuit over wide limits as a result of any tendency of the milk stream to depart from a predetermined pasteurizing temperature.

It is another object of the invention to provide an improved temperature controlling system for a pasteurizer in which a large amount of electrical energy for conversion into heat is controlled by a circuit of limited current carrying capacity and which entirely avoids the use of electrical contacts.

Other objects and advantages of the invention will become apparent to one skilled in the art as the discussion proceeds taken in connection with the drawing which discloses a preferred embodiment thereof. While only one embodiment of my invention is described herein the invention is by no means to be considered limited to the specific circuit arrangement set forth but obviously includes other alternative schemes which will appear to one skilled in the art and which are included within the basic teachings and covered by the claim appended hereto.

Referring now to the drawing the disclosed system will be seen to include apparatus for detecting and amplifying a control signal resulting from a temperature change and utilizing such control signal to vary the phase of a phase shifting circuit. A signal derived from such circuit is then utilized to control the grid of an electron valve having a current-controlling saturable reactor in its load circuit. The latter reactor is preferably utilized to control the alternating current flowing between suitable electrodes immersed or in contact with a continuously flowing stream of milk. It will be understood, however, that such broad outline of the system is purely in the nature of an introduction and the success of the present invention is due in large measure to the improved circuit arrangement which will be discussed in detail.

In the continuous flow pasteurization of milk a temperature detector device may be placed directly in contact with the milk and on the downstream side of a suitable heater. In the present device the detector indicated generally at 10 consists of a bellows 11 having a temperature responsive fluid sealed therein. Such bellows is mechanically coupled by an arm 12 to a control head 14, the latter producing an output signal, the magnitude of which is dependent upon the temperature. While the control head does not per se form a part of the present invention it preferably includes a primary winding 15 energized by a source of alternating voltage and a secondary or output winding 16. Such windings are variably coupled either by changing the reluctance of the magnetic circuit linking them or by moving one coil with respect to the other. In any event, the voltage from the control head is suitably amplified to provide a pulsating direct current which corresponds to the input voltage in magnitude and which is sufficiently strong to control the saturating winding of a saturable reactor. Such amplifier in the present instance includes a first stage 18 and a second stage 19.

Turning attention now to the first stage of amplification it will be seen that it includes an electron valve 20 having a control electrode 20a and an anode 20b. Anode voltage is supplied in the valve 20 from any suitable source, such source in the present instance also including a rectifier 21 and a parallel connected capacitor 22 and resistor 24 in its plate circuit. The rectifier 21 is supplied with alternating voltage from terminals 25 which are in series with a resistor 26. Preferably the valve 20 and the rectifier 21 are included within the same envelope.

In series with the anode circuit of the valve 20 is a potentiometer 28 having a by-pass capacitor 29 for diverting the alternating component of the voltage appearing across the potentiometer. In this way a substantially direct voltage which is adjustable in magnitude may be obtained from the slider 28a of the potentiometer for exciting the second stage of amplification.

Drawing attention to the mid-portion of the drawing, it will be seen that the second stage of amplification includes a valve 30 having a control electrode 30a and an anode 30b. Means are provided for supplying the anode with substantially pure and direct voltage which is constantly maintained at a predetermined value in spite of possible fluctuations in line voltage. In the present instance such voltage is supplied by a full wave rectifier 31 the output of which is smoothed by a filter 32 feeding into a tapped output resistor 34. Shunted across a portion of the resistor 34 is a voltage regulating tube 35 which may, if desired, be of the type known to the art as VR-75-30. Since the voltage applied to the valve 30 is thus maintained at a constant value, the current flowing in the anode circuit of the valve is dependent only upon the input voltage applied to the control electrode or grid 30a.

In accordance with one of the aspects of the invention the current flowing in the anode circuit of the second stage of amplification is utilized to control the operation of a phase shifting circuit designated generally at 36. Such phase shifting circuit includes a transformer 38 having a secondary winding connected to output terminals 39, 40 and a center tap 41. Placed in series across the output terminals 39, 40 is a resistor 42 and a saturable reactor 44. The latter is of the conventional type having a main current carrying winding 45 and a saturating or control winding 46. The main winding 45 forms one leg of the phase shifting circuit while the control winding 46 is supplied with direct current from the amplifier 19. At the junction point of the winding 45 and the resistor 42 is an output terminal 48, the companion output terminal being the center tap 41 on the transformer secondary.

With regard to the operation of the phase shifting circuit 36 it will be appreciated by one skilled in the art that the current flowing therein will be of a phase dependent upon the relative magnitudes of the inductance of winding 45 and the resistance of the resistor 42. By changing the amount of current flowing through the winding 46, the inductance of the winding 45 may be caused to vary over wide limits. The phase of the voltage appearing across the output terminals 41, 48 will likewise undergo a large change in phasing.

In the practice of my invention variations in phasing of the voltage derived from the circuit 36 are employed to control the average direct current conducted by an electron valve and by a second saturable reactor connected in the load circuit thereof. The electron valve referred to is the valve 49 having a control electrode 49a, an anode 49b and a cathode 49c. The cathode 49c is preferably connected to the terminal 41. The control electrode 49a is connected to the terminal 48 through a grid resistor 50. Included in the load or anode circuit of the valve 49 is a main saturable reactor 51. The control winding 52 of such reactor carries the anode current while a load winding 54 is in series with a milk heating device 55. The current supplied to the valve 49 and the control winding 52 is obtained from an alternating supply line having terminals 56. In order that the current supplied by the terminals 56 may be regulated in a predetermined manner and to allow calibration of the circuit, it is necessary that there be a definite phase relation between the voltage across such terminals and the voltage supplied to the transformer 38 of the phase shifting circuit. This is normally accomplished by utilizing the same supply line.

Since current may only flow in one direction through the valve 49 it will be apparent that the control winding 52 of the reactor 51 will be supplied with half waves of current. In order to prevent the collapse of the magnetic field of the saturable reactor 51 upon cessation of current in the winding 52 and to cause such current to flow more smoothly therein, a rectifier 58 is shunted across the winding 52. As shown, the anode 58a of such rectifier is placed on the same side of the line as the anode 49b of the valve 49. Included in the anode circuit of the rectifier 58 is a protective resistor 59 of relatively low resistance.

The operation of the portion of the circuit thus described will become apparent by considering the effect of a positive voltage applied to the anode 49b. The resulting current flow in the valve 49 will cause a flow in the winding 52 in the direction indicated by the arrow 60. At the end of the half wave of current, any tendency for the magnetic field to collapse will result in positive voltage being applied to the anode 58a of the rectifier 58. Thus the rectifier 58 provides a path for maintaining residual current flow in the winding 52 during the idle half cycle in the operation of the valve 49. In short, the arrangement shown causes a direct current flow in the winding 52 which is relatively constant. As an aid in maintaining such constancy it is, of course, desirable that the resistance of the control winding 52 and of the rectifier 58 be as low as possible. Thus the rectifier is preferably of the gas-filled type. An additional advantage of the arrangement shown is that the high voltages normally accompanying the breaking of an inductive circuit are eliminated thereby reducing the possibility of failure of circuit components which would ordinarily be subject to such high voltages.

In the preceding discussion it has been assumed that the control electrode 49a of the valve 49 has been supplied with a constant voltage of a proper magnitude and phasing to enable the valve 49 to carry a moderate current in its load circuit. If, for example, the voltage supplied to the control electrode 49a were in phase with the voltage applied to the anode 49b the valve 49 would conduct a maximum amount of current. It will be apparent to one skilled in the art that if the voltage supplied to the control electrode 49a were 180 degrees out of phase with the anode voltage, no current could flow through the valve. Under such circumstances the control electrode would be negative and would repel any electrons tending to flow to the positive anode. However, due to the improved phase shifting arrangement previously discussed, the voltage applied to the control electrode 49a varies in phase over relatively wide limits. In this way current will flow through the valve 49 only during a predetermined portion of the active half cycle. Accordingly, the average current flowing through the control winding 52 is varied precisely in accordance with the phasing of the voltage developed in the phase shifting circuit 36 and the latter, as we have seen, is dependent upon the output voltage of the amplifier 18, 19 or, in other words, to the condition of the temperature sensitive device 11.

Turning attention now to the milk heater 55, it will be noted that it contains two electrodes 61, 62 which are more or less schematically indicated as in opposed relation within a milk conduit 64. The current which is conducted through the milk is obtained from a source of alternating current 65. Using the circuit shown conduction has been found to take place readily through the milk due to the conductivity afforded by certain salts naturally present therein in dissociated form. Although the conductivity of the milk may change through wide limits, the change in the impedance of the winding 54 of the saturable reactor is sufficient to maintain the current flow at a value which will cause the desired number of heat units to be added to the milk stream. While the disclosed circuit arrangement has been found to be particularly well adapted to the controlling of temperature by varying the current flow through the milk, it is also possible to obtain a number of advantages using milk heaters of the resistive type. For example, the electrodes 61, 62 may be mounted externally of the conduit 64 and connected to a heating coil which surrounds the conduit. The latter scheme, however, has the disadvantage that any practical heater has thermal inertia which adversely affects the accuracy with which the temperature may be controlled.

While the overall operation of the control system will be apparent upon a reading of the above, it may be helpful to summarize it briefly. With the sensitive bellows 11 located on the downstream side of the heater any departure in temperature from the predetermined mean value will immediately be reflected in a change in the voltage applied to the control electrode 20a in the first stage of application. The latter will produce a corresponding change in the direct voltage applied to the control electrode 30a in the second stage of amplification. The resulting change in the direct current flowing through the control winding 46 of the saturable reactor 44 causes the phasing of the voltage across the terminals 41, 48 to suffer marked change. The latter is reflected immediately in the average current conducted by the valve 49 and the series connected control winding 52. The resulting change in impedance of the saturable reactor winding 54 immediately causes a corrective change to take place in the amount of current conducted between the electrodes 61, 62. The heat is thus temporarily stabilized at a new value until the temperature detector indicates that a further change is necessary.

The extreme sensitivity and rapid response afforded by the system described herein has made it possible for the pasteurizing temperature to be maintained well within the desired range of 161–164 degrees Fahrenheit. This has been accomplished in spite of the fact that the heat imparted to the milk by conductivity varies as the square of the current supplied thereto. The control system for accomplishing such a desirable result is straightforward and may be readily constructed using standard electronic components. Conveniently, the desired temperature may be set by adjustment of the slider 28a and, once adjusted, the circuit has been found to accurately maintain its calibration in spite of wide variations in the composition, rate of flow, and initial temperature of the milk.

I claim:

A temperature control system for the continuous pasteurization of milk flowing between a pair of electrodes, comprising in combination, a temperature responsive device including means for producing a direct voltage corresponding to the temperature of milk downstream from said electrodes, a direct coupled amplifier having a regulated supply voltage, a phase shifting circuit including a first saturable reactor, the saturating winding of which is energized by the output of said amplifier, a gaseous output tube having a control element therein controlled by the phase of said phase shifting circuit, and a second saturable reactor having a saturating winding arranged to conduct the plate current of said output tube and a main winding in series with said electrodes for correctively controlling the magnitude of the current passing therethrough to keep the pasteurizing temperature within narrow limits in spite of large variation in flow, composition, and initial temperature of the milk.

JOHN I. HALL.

REFERENCES CITED

The following references are of record in the file of this patent:

UNITED STATES PATENTS

| Number | Name | Date |
|---|---|---|
| 2,100,327 | Getchell | Nov. 30, 1937 |
| 2,234,184 | MacLaren, Jr. | Mar. 11, 1941 |
| 2,250,207 | Schneider | July 22, 1941 |
| 2,266,569 | Schneider et al. | Dec. 16, 1941 |